(12) United States Patent
Epstein

(10) Patent No.: US 6,490,355 B1
(45) Date of Patent: Dec. 3, 2002

(54) METHOD AND APPARATUS FOR USE OF A TIME-DEPENDENT WATERMARK FOR THE PURPOSE OF COPY PROTECTION

(75) Inventor: Michael A. Epstein, Spring Valley, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/257,079

(22) Filed: Feb. 24, 1999

Related U.S. Application Data
(60) Provisional application No. 60/092,728, filed on Jul. 14, 1998.

(51) Int. Cl.[7] .............................. H04N 7/08; H04N 7/50
(52) U.S. Cl. .................. 380/203; 380/54; 380/201; 705/51; 705/57; 713/165; 713/176; 713/178; 713/179
(58) Field of Search .............................. 713/165, 168, 713/176, 178, 179, 181; 380/54, 201, 203; 705/51, 57

(56) References Cited

U.S. PATENT DOCUMENTS 6,185,312 B1 * 2/2001 Nakamura et al. .......... 382/100

FOREIGN PATENT DOCUMENTS

| JP | 09326166 A | 12/1997 | ........... G11B/20/10 |
|---|---|---|---|
| WO | WO9743761 A2 | 11/1997 | ........... G11B/20/00 |
| WO | WO9743853 A1 | 11/1997 | ........... H04N/5/913 |
| WO | WO9833325 A2 | 7/1998 | ........... H04N/7/50 |
| WO | WO9844402 A1 | 10/1998 | ........... G06F/29/06 |

* cited by examiner

Primary Examiner—Justin T. Darrow
(74) Attorney, Agent, or Firm—Edward W. Goodman

(57) ABSTRACT

A copy protection system for protecting content wherein a ticket and a watermark are created, utilizing a first time reference (TD) and a one-way function, to indicate the copy protection status of the content. A source device produces the ticket and watermark using a first time reference and a hashing function. The source device provides a data stream containing the content, the ticket, the watermark, and the first time reference (TD) to the receiver device. The receiver device determines if the first time reference (TD) is contained within a time window determined by a second time reference. When, the first time reference (TD) is contained within the time window, the receiver compares the ticket to the watermark using the first time reference (TD) and the one-way function, and based on the comparison, produces a signal indicating the copy protection status of the content.

14 Claims, 3 Drawing Sheets

METHOD AND APPARATUS FOR USE OF A TIME-DEPENDENT WATERMARK FOR THE PURPOSE OF COPY PROTECTION

CROSS-REFERENCE TO RELATED APPLICATIONS

This application claims the benefit of U.S. Provisional Application Ser. No. 60/092,728, filed Jul. 14, 1998.

FIELD OF THE INVENTION

This invention generally relates to a system for protecting content. Specifically, the present invention pertains to utilizing a ticket, a watermark, and a time reference to indicate the copy protection status of content.

BACKGROUND OF THE INVENTION

The ability to transmit digital information securely is increasingly important. Owners of content want to be able to provide the content to authorize users without having the content utilized by unauthorized users. However, one problem with digital content is that an exact copy can be made without any degradation in the quality of the copy. Therefore, the copying of digital content is very attractive to pirating operations or attackers.

There are several different levels of attackers. Each type of attacker has a different level of sophistication, motivation, and means (software and hardware) needed to defeat a copy protection method. There are four typical types of attackers, a casual attacker, a hacker, a small-scale pirate, and a commercial pirate.

A casual attacker is an ordinary consumer that is motivated to copy content for later use (time shifting) or for distribution to friends and relatives. The level sophistication of a casual attacker is low. The casual attacker will typically only use consumer equipment in an unmodified form. A more aggressive casual attack may be mounted if a relatively inexpensive modification to consumer equipment is available. This may take the form of a hardware device such as the equipment used to defeat the Macrovision system. Typically, a casual attacker will not open a product to access the internal connections.

A hacker is usually motivated to copy protected content just to see if it can be done. The content may then be distributed widely in avoidance or in spite of copy protection laws. An attacker of this type is often highly skilled and may go to great lengths to acquire content. The financial resources of such an attacker are limited but the time resources can be high. Once the content is acquired, the content may be distributed to friends and relatives. In addition, the Internet may also provide an anonymous method for distributing the illegally copied content.

Both small-scale and commercial pirates are interested in defeating copy-protected content in order to produce and sell illegal copies of the content. By avoiding payments to the rightful owner of the copy-protected content, the pirates may reap large profits. Typically, the pirate may take advantage of the difference in release windows in order access high value content and distribute it.

For instance, in the movie industry, release windows are utilized to maximize profit from content. The essence of these release windows is to first release the content to a premium service such as a pay-per-view service or a video on demand service. Thereafter, the content may be released on a lower price service such as a home-box-office service. At this time, the content may also be available to a consumer through a purchased storage medium such as a Digital Video Disc (DVD).

Pirates however, frustrate the use of these release windows by pirating the content that is available through the premium service and then releasing pirated versions of the content to the public. This may cause substantial financial losses to the rightful owners of the content. Accordingly, a successful copy protection scheme should at least frustrate a pirates attempt for a sufficient period of time till the legitimate owner of the content may reap their rightful profits.

As a class, pirates are assumed to have information not readily available to the consumer including a direct knowledge and understanding of the circuitry within a product. Additionally, the pirate is willing to open the cover of the device to gain access to internal connections. These connections can be easily accessible or may take some amount of specialized tooling to locate or tap. A pirate may have the ability to reverse engineer a product sufficiently to determine the location of clear digital signals. A pirate may also have detailed information about internal circuitry of consumer electronics devices that would allow for the tapping of clear digital signals before or after compression. The pirate typically has the understanding needed to use expensive custom hardware that is designed to break cryptographic keys. Finally, the pirate is assumed to have knowledge of the algorithms and protocols used within the copy protection system and some ability to attempt to defeat them. The systems used to defeat copy protection may include a PC, a group of PCs, or custom-built equipment assembled for the sole purpose of defeating copy protection.

Beyond some level of attacker, the expense of defeating the attacker exceeds a reasonable limit whereby the device must be priced beyond what consumer is willing to pay. Thus, a copy protection solution must be cost effective but secure against a large number of attackers.

A cost-effective method of copy protection is discussed in detail by Jean-Paul Linnartz et al., in Philips Electronics Response to Call for Proposals Issued by the Data Hiding Subgroup Copy Protection Technical Working Group, July 1997 ("Linnartz"), which is incorporated herein by reference. Within a digital transmission, such as an MPEG transport stream, additional data may be embedded within the transport stream to set the copy protection status of content contained within the digital transmission. For instance, the desired copy protection status may be "copy-once", "no-more-copy", "copy-never", and "copy-freely". Content that has a status of copy-once may be played and copied. During copying, the copy-once content is altered such that the content is in the no-more-copy state. Copy-never content is content that may only be played and may not be copied. Copy-freely content may be played and copied without restriction.

The additional data may take the form of a digital watermark. The watermark may be embedded directly into the content so that removal of the watermark will degrade the quality of the content. The watermark may be utilized as part of the copy protection scheme. As an example, the copy-freely state may be designated by the lack of a watermark within the content.

In operation, a transmission, such as a digital transmission, is sent from a source device and received by a receiving device. A source device is a device that is writing content onto a data bus, initiating a broadcast transmission, initiating a terrestrial transmission, etc. A sink device is a device that reads content from the data bus, etc.

FIG. 1 shows a typical system for the transmission of content. In FIG. 1, the source device is a broadcast initiator 101 that utilizes a transmitting antenna 102 to transmit content. The sink device is a broadcast receiver, such as a set-top-box (STB) 104 that utilizes a receiving antenna 103 for receiving the transmitted content. The STB 104 is shown connected to a display device 105, a player 106, and a player/recorder 107, through a bus 108. The term bus is utilized herein to refer to any system for connecting one device to another device. The bus may be a hard wired system such as a coaxial wire, an IEEE 1553 bus, etc., or the bus may be a wireless system such as an infra-red or broadcast system. Several of the devices shown in FIG. 1 may at one time act as a source device and at another time act as a sink device. The STB 104 may be a sink for the broadcast transmission and be a source for a transmission on the bus 108. The player/recorder 107 may be a source/sink of a transmission to/from, respectively, the bus 108.

In the copy protection scheme discussed by Linnartz, a watermark (W) is embedded within transmitted content. A ticket is transmitted along with the transmitted content. The embedded watermark and the ticket together are utilized to determine the copy protection status of the transmitted content. The watermark may be embedded into the content by at least two known methods. One method embeds the watermark (W) in the MPEG coding of the content. Another method embeds the watermark (W) in the pixel data of the content. The ticket (T) is cryptographically related to the watermark (W).

Performing one or more one-way functions on the ticket (T) derives the watermark (W). By use of the term one-way function, what is meant is that it is computationally unfeasible to compute the inverse of the function. An example of a publicly known cryptographic one-way function is a hashing function, such as secure hash algorithm one (SHA–1) or RACE Integrity Primitives Evaluation Message Digest (RIPEMD). Computing an inverse means finding which particular $x_0$ leads to a given $y_0$ with $y_0=F(x_0)$. The term unfeasible is intended to mean that the best method will take too long to be useful for a pirate. For instance, the time that is required for a pirate to compute the inverse of a hashing function is too long for the pirate to frustrate the intended release window for protected content. The most efficient method known to find such an $x_0$ may be to exhaustively search all possible bit combinations of $x_0$ and to compute and verify $F(x_0)$ for each attempt. In other cases, there may be a more efficient method than an exhaustive search to compute an inverse of a one-way function, yet these methods are still too time consuming to be feasible for the pirate.

The bit content of the ticket (T) is generated from a seed (U). The content owner provides the seed (U). From the seed (U) a physical mark (P) is created. The physical mark (P) may be embedded on a storage medium such as a Read-Only Memory (ROM) disk. Performing one or more one-way functions on the physical mark (P) produces the ticket (T). The number of functions performed on the physical mark (P) to create the ticket (T) depends on the copy protection intended for the content.

In accordance with the system, the ticket (T) changes state during every passage of a playback device (e.g., a source device) and a recording device (e.g., a. sink device). As discussed above, the state modifications are cryptographically irreversible and reduce the remaining copy and play rights of the content that are granted by the ticket (T). In this way, the ticket (T) indicates the number of sequential playback and recordings that may still be performed and acts as a cryptographic counter that can be decremented but not incremented.

It should be noted that the copy protection scheme only protects content on compliant systems. A compliant system is any system that obeys the copy protection rules described above and hereinafter. A non-compliant system may be able to play and copy material irrespective of the copy protection rules. However, a compliant system should refuse to play copies of content illegally made on a non-compliant system.

In accordance with the copy protection scheme, a physical mark (P) (e.g., data) is stored on a storage medium and is not accessible by other user equipment. The physical mark (P) data is generated at the time of manufacturing of the storage medium as described above and is attached to the storage medium in a way in which it is difficult to remove the physical mark (P) data without destroying the storage medium. The application of a one-way cryptographic function, such as a hashing function, to the physical mark (P) data four times results in a watermark.

A watermark by itself may indicate whether or not content stored on the storage medium is copy-once or copy-never. For instance, the absence of a watermark may indicate that the content may be copied freely. The presence of the watermark without a ticket on a storage medium may indicate copy-never content.

When the content is transmitted over a bus or other transmission medium, the physical mark (P) data is hashed twice to generate a ticket. When a compliant player receives the content, the ticket is hashed twice and matched to the watermark. In the case where the twice hashed ticket and the watermark match, the content is played. In this way, a party may not substitute a false ticket along with the content to frustrate the copy protection scheme. In the case were there is a ticket but no watermark in the content, a compliant system will refuse to play the content.

When a compliant recorder reads the content, the watermark is checked to see if the material is copy-freely, copy-once, or copy-never. When there is no watermark, the content is copy-freely and may be copied freely as discussed above. When the content contains a watermark but no ticket, the content is copy-never and a compliant recorder will refuse to copy the content however, a compliant player will play the content. When the content is copy-once, the content contains both a watermark and a ticket, the ticket is hashed twice and compared to the watermark. In the case where the watermark matches the twice hashed ticket, the content may be recorded along with a once-hashed ticket and the watermark, thereby creating copy-no-more content (e.g., content with a once-hashed ticket and a watermark).

It should be noted that in a broadcast system, such as a pay-per-view system, a copy-never state may be indicated by the presence of a once-hashed ticket and a watermark. Both copy-no-more stored content and copy-never broadcast content are treated by a compliant system similarly. The content containing the once-hashed ticket may be played but may not be recorded in a compliant system. In the event that a party tries to record the content with the once-hashed ticket, a compliant recorder will first twice-hash the once-hashed ticket and compare the result (e.g., a thrice-hashed ticket) with the watermark. Since the thrice-hashed ticket will not match the watermark, the compliant recorder will refuse to record the content.

A compliant player that receives the once-hashed ticket will hash the once-hashed ticket and compare the result (e.g., a twice-hashed ticket) to the watermark. Since the twice-hashed ticket matches the watermark, the compliant player will play the content.

However, a problem exists wherein a non-compliant recorder receives content containing a twice-hashed ticket and a watermark. In the event that a non-compliant recorder does not alter the ticket upon receipt or recording, the non-compliant recorder may make multiple copies of the ticket and the watermark which will play on a compliant player and which may be recorded on a compliant recorder. The same problem can exist where a non-compliant recorder receives content containing a thrice-hashed ticket and a watermark indicating copy-no-more content. In this case, the non-compliant recorder may make multiple copies of the thrice-hashed ticket and the watermark that will play on the compliant player.

In a case wherein the player receives the content directly from a read only medium, such as a Compact Disc ROM (CD-ROM), a physical mark can be embedded in the physical medium of the CD-ROM that is produced by an authorized manufacturer. The player may then check the physical mark to ensure that the content is being received from an authorized medium. In this way, if a pirate makes an unauthorized copy, the physical mark will not be present on the. unauthorized copy and a compliant player will refuse to play the content. However, in the case of broadcast data for instance, wherein a player does not read content directly from the read-only medium, this method of copy protection is unavailable.

Accordingly, it is an object of the present invention to overcome the disadvantages of the prior art. It is also an object of the present invention to provide a method of transmitting copy protected copy-never content that will prevent a pirate from making copies that will play on a compliant player.

SUMMARY OF THE INVENTION

These and other objects of the present invention are achieved by a copy protection system for protecting content wherein a ticket and a watermark are utilized to indicate the copy protection status of the content. In accordance with the present invention, the ticket and watermark are created utilizing a first time reference (TD) and a one-way function. The system utilizes a source device to produce the ticket and watermark. The watermark is then embedded into the content in such a way that the watermark can not be removed from the content without largely degrading the content. The ticket is then transmitted, along with the first time reference (TD), the embedded watermark, and the content, to a receiver device. Prior to playing, recording, etc, the receiver device verifies the ticket and watermark utilizing the first time reference, and thereby, determines the copy protection status of the content.

During authorized creation of a medium such as a CD_ROM containing content, a physical mark is placed on the CD-ROM that is not accessible by typical user equipment. The data for the physical mark may be calculated by processing (e.g., performing a hashing function) seed data. Seed data is determined utilizing randomly occurring phenomena such as natural physical phenomena (e.g., the number of gamma ray emissions from the sun in a determined period of time). The methods for determining suitable seed data are known by a person of ordinary skill in the art. The seed data is selected such that there is a negligibly small chance that a party would guess the seed data.

At the source device (e.g., a broadcasting device), in a preferred embodiment, a one-way function, such as a hashing function, is performed on the physical mark data to produce a ticket (T). The ticket (T) is combined with the first time reference (TD), utilizing for instance a concatenation function, to produce a result (T.TD). A hashing function is performed on the result (T.TD) to produce a ticket (T'). The ticket (T') is combined with the first time reference to produce a result (T'.TD). The hashing function is performed on the result (T'.TD) to produce a ticket (T"). The ticket (T") is combined with the first time reference (TD) to produce a result (T".TD). The hashing function is performed on the result (T".TD) to produce a ticket (T'"). The ticket (T'") is combined with the first time reference (TD) to produce a result (T'".TD). The hashing function is performed on the result (T'".TD) to produce the watermark.

The ticket (T") may be utilized to indicate that the content may be copied once (e.g., a copy protection status of copy-once). The ticket (T'") may be utilized to indicate that the content may never be copied (e.g., a copy protection status of copy-never). The source device transmits to the receiver device a data stream containing the content with the watermark embedded therein, the first time reference (TD), and the ticket (T"), for instance if the copy protection status of the content is copy-once. Alternate tickets, such as the tickets discussed above, may be transmitted in the data stream to indicate an alternate copy protection status for the content.

It should be noted that although in the above-described embodiment, the time reference (TD) is concatenated with every hash, it would be sufficient in some circumstances that the time reference (TD) is only utilized in a single operation for deriving the ticket.

The receiver device receives the data stream, and if the first time reference (TD) is contained within a time window determined by a second time reference, the receiver device compares the ticket (T") to the watermark using the first time reference (TD) and the hashing function. Specifically, at the receiver device, the ticket (T") is combined with the first time reference, and the hashing function is performed on the result (T".TD) to produce the ticket (T'"). The ticket (T'") is combined with the first time reference, and the hashing function is performed on the result (T'".TD) to produce a result (T"") that should equal the watermark (W). In a case when the result (T"") equals the watermark (W), the receiver device makes the content available for copying and/or playing. However, if the receiver device receives the data stream and the first time reference (TD) is not contained within the time window determined by the second time reference, then the receiver device will not make the content available for copying or playing. In addition, even when the first time reference (TD) is contained within the time window determined by the second time reference, if the result (T"") is not equal to the watermark (W), then the receiver device will not make the content available for copying or playing.

BRIEF DESCRIPTION OF THE DRAWINGS

The following are descriptions of embodiments of the present invention that when taken in conjunction with the following drawings will demonstrate the above noted features and advantages, as well as further ones. It should be expressly understood that the drawings are included for illustrative purposes and do not represent the scope of a present invention. The invention is best understood in conjunction with the accompanying drawings in which.

DETAILED DESCRIPTION OF THE INVENTION

Figure 1:
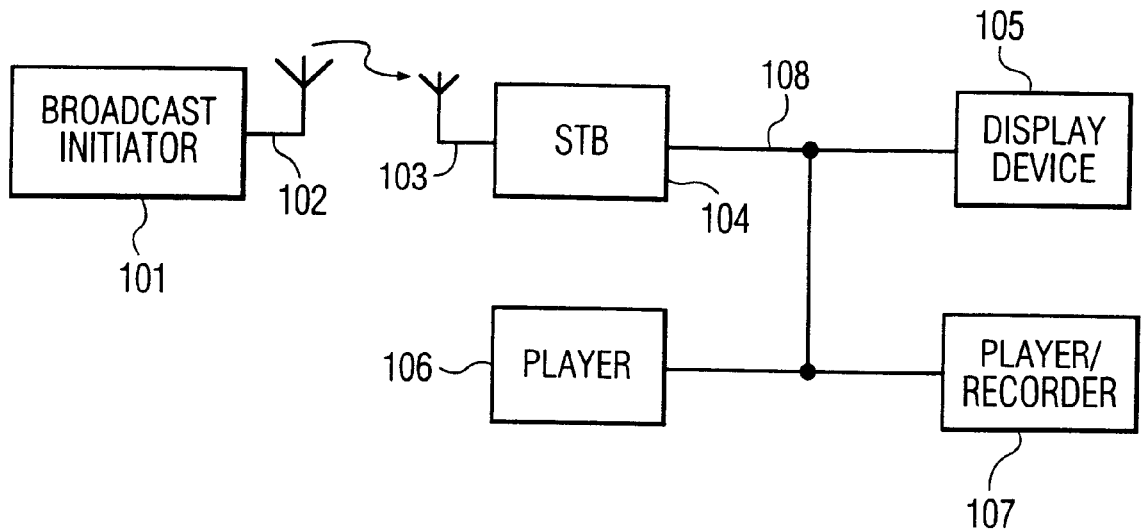
FIG. 1 shows a conventional system for the transmission of content.
Figure 2:
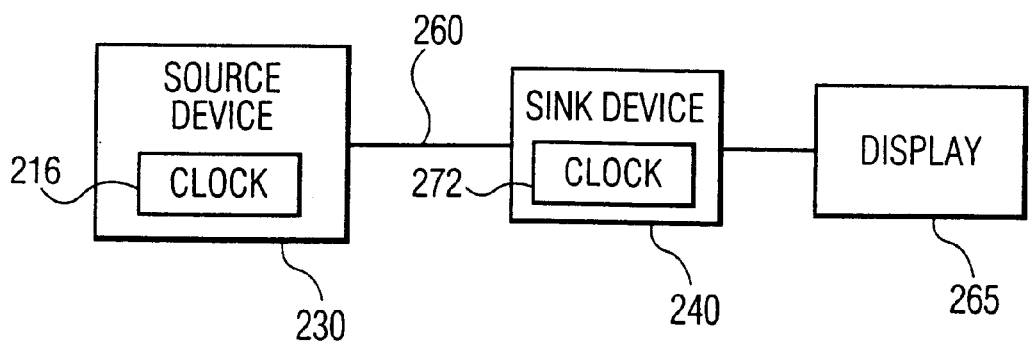
FIG. 2 shows an illustrative communication network in accordance with an embodiment of the present invention.

FIG. 2 depicts an illustrative communication network in accordance with an embodiment of the present invention. A source device 230, such as a Digital Video Disc (DVD), a Digital Video Cassette Recorder (DVCR), or another source of content, having a time reference, such as a clock 216, transmits content to a sink device 240 via a transmission channel 260. The transmission channel 260 may be a IEE-1394 (firewire) bus, a telephone network, a cable television network, a computer data network, a terrestrial broadcast system, a direct broadcast satellite network, etc., or some combination thereof. As such, the transmission channel 260 may include RF transmitters, satellite transponders, optical fibers, coaxial cables, unshielded twisted pairs of wire, switches, in-line amplifiers, etc. The sink device contains a time reference, such as a clock 272, that is utilized in determining the copy protection status of the received content. In the event that the copy protection status of the received content is such that the content may be displayed, the content is provided to a display device 265 for display thereon. The content may be provided from the source device 230 in the form of a Moving Picture Experts Group (MPEG) compliant transport stream, such as an MPEG-2 compliant transport stream, or as any other data stream that is known in the art for transmitting content.

Figure 3:
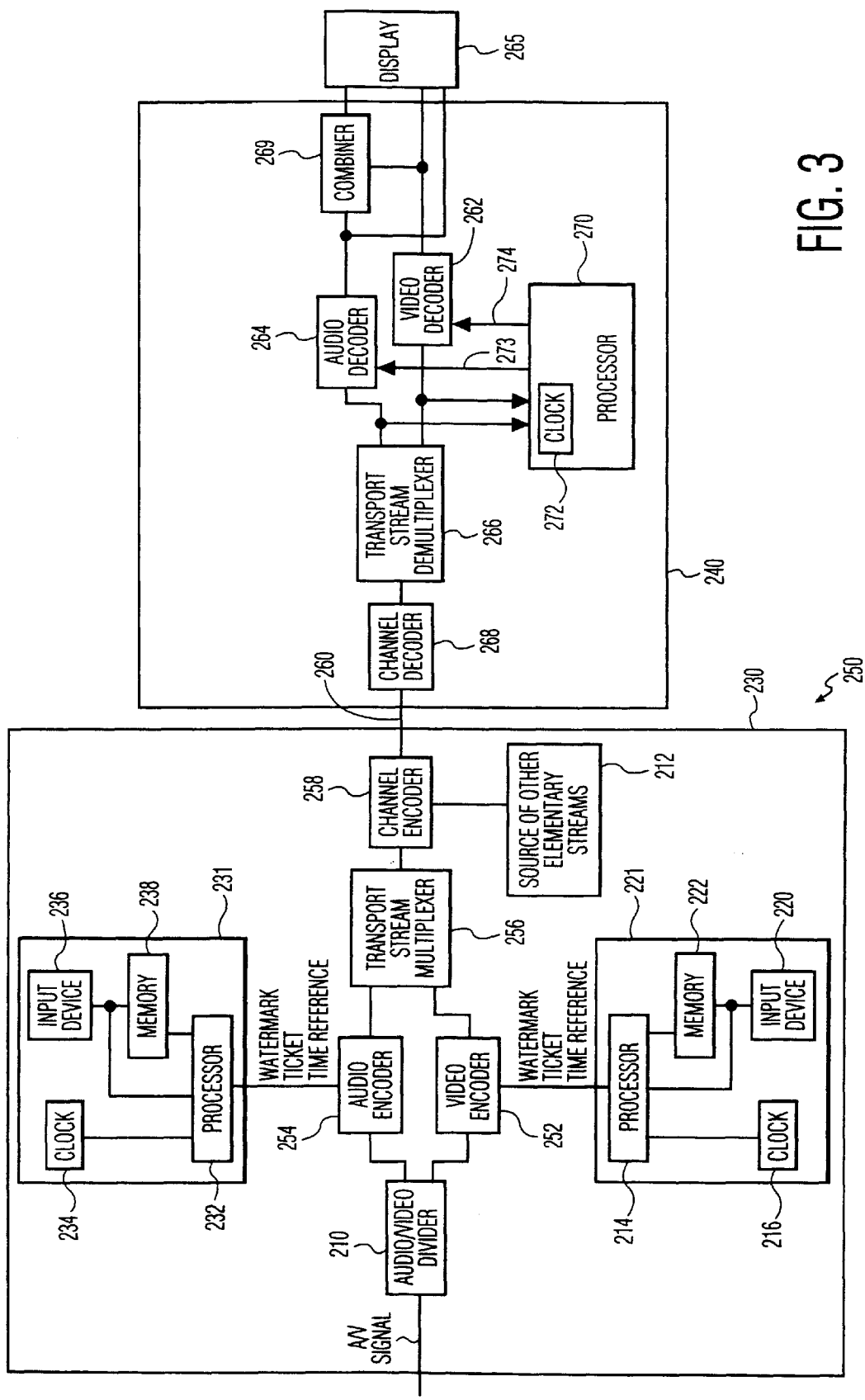
FIG. 3 shows an illustrative communication network in accordance with an embodiment of the present invention wherein a source device provides content to a sink device in the form of an MPEG transport stream.

FIG. 3 depicts an illustrative communication network 250 in accordance with an embodiment of the present invention wherein the source device 230 provides content to the sink device 240 in the form of an MPEG transport stream. An audio-video signal, such as an analog NTSC signal, a PAL signal, an HDTV signal, etc., is divided into audio and video component signals by an audio/video divider 210. The audio signal is digitized, encoded, and combined with a ticket, a watermark, and a time reference by an audio encoder 254. The video signal is converted to a standard input format, such as luminance signal Y and chrominance signals $C_r$ and $C_b$, digitized, and combined with a ticket, a watermark, and a time reference by a video encoder 252, as described in more detail below.

In the embodiment shown, copy protection authorization circuits 231 and 221 are, respectively, connected to the audio decoder 254 and the video encoder 252. In an alternate embodiment, either one of copy protection authorization circuits 231 and 221 may be utilized. For the sake of brevity, only copy protection authorization circuit 221 will be described herein. However, the operation of copy protection authorization circuit 221, as described herein below, also applies to copy protection authorization circuit 231.

The copy protection authorization circuit 221 contains a processor 214, a clock 216, a memory 222, and an input device 220. The input device 220 is utilized to input seed data to the processor 214, either directly, or through the memory 222. The input device 220 may be a keyboard, a smart card reader, a floppy disk reader, a Compact Disc (CD) reader, etc. The input device 220 may also receive seed data derived from an A/V signal as shown. The input device 220 may. also be utilized to indicate to the processor 214 the desired copy protection status of the content. The processor 214 utilizes the seed data and a time reference signal (TD), received from the clock 216, to create a ticket and a watermark. The time reference signal (TD) is a representation, such as a digital representation, of the time and date when creation of the ticket and watermark is commenced. In a preferred embodiment, a one-way operation, such as a hashing function, is performed on the seed data to derive a physical mark (P). For the sake of brevity, it can be said that computing a hash of the seed data derives the physical mark (P):

$$H(\text{seed}) = \text{physical mark } (P). \tag{1}$$

In alternate embodiments, the processor 214 may simply be a fixed hardware device that is configured for performing the hashing function as well as other mathematical functions (e.g., a concatenation function). In addition, there may be no memory 222 and/or input device 220. The video encoder 252 may also, or alternatively, be an integral part of the copy protection authorization circuit 221. In one embodiment, data representing the physical mark (P) is transmitted along with the video signal and therefore, there is no need to derive the physical mark (P) data.

In any event, a hash of the physical mark (P) data is computed to derive the ticket (T):

$$H(\text{physical mark } (P) \text{ data}) = T. \tag{2}$$

The ticket (T) is then combined with the time reference signal (TD), for instance utilizing a concatenation operation, to produce a combined result (T.TD). The watermark (W) is then created by the following sequence:

$$H(T.TD) = T'; \tag{3}$$

$$H(T'.TD) = T''; \tag{4}$$

$$H(T''.TD) = T'''; \tag{5}$$

$$H(T'''.TD) = W. \tag{6}$$

The ticket (T") is utilized to indicate that the content may be copied once (e.g., a copy protection status of copy-once). The ticket (T''') is utilized to indicate that the content may never be copied (e.g., a copy protection status of copy-never).

The watermark, the first time reference (TD), and the ticket (T"), for instance if the desired copy protection status of the content is copy-once, are then transmitted to the video encoder 252. At the video encoder 252, the watermark (W) is embedded into the digitized video signal in such a way that the watermark (W) may not be removed from the digitized video signal without largely degrading the digitized video contained therein. Alternate tickets, such as the other tickets discussed above, may be transmitted to the video encoder 252 to indicate an alternate copy protection status of the content.

It should be noted that similar to the above described process for the video encoder 252, the ticket (T"), the watermark (W), and the time reference signal (TD) may also, or alternatively, be transmitted to the audio encoder 254 from the copy protection authorization circuit 231.

The signal output from the video encoder 252 and the audio encoder 254 may be referred to as compressed signals. The compressed signals contain the ticket, the first time reference (TD), the embedded watermark, and the respective digitized video and audio signals.

The compressed signals output from the video encoder 252 and the audio encoder 254, respectively, are input to a transport stream multiplexer 256. The video and audio signal output from the respective encoders are referred to as elementary streams. The transport stream multiplexer 256, illustratively, may also receive elementary streams from a number of other sources (e.g., a source 212). The content contained in the elementary streams from the source 212 may also have a copy protection status that is the same or different from the copy protection status of the signals received from the video and audio encoders 252, 254.

The transport stream multiplexer 256 multiplexes the elementary streams of one or more programs into one or more transport streams. The transport streams output by the transport stream multiplexer 256 are input to a channel encoder 258. The channel encoder 258 encapsulates the one or more transport streams into one or more channel layer streams and modulates each channel layer stream onto a carrier signal or frequency channel. The channel layer streams output by the channel encoder 258 are then transmitted via the transmission channel 260. As discussed above, the transmission channel 260 may be an IEEE 1394 firewire Bus, a telephone network, a cable television network, a computer data network, a terrestrial broadcast system, a direct broadcast satellite network, etc., or some combination thereof.

The transmitted channel streams are received at a channel decoder 268. The channel decoder 268 demodulates the channel streams for the respective carrier signals or frequency channels and recovers the one more transport streams from the received channel streams. The recovered transport streams are then input to a transport stream demultiplexer 266. The transport stream demultiplexer 266 extracts particular elementary streams from the input transport streams corresponding to one or more user selected programs. An extracted video signal elementary stream is input to a video decoder 262 and a copy protection status determination circuit 270. An extracted audio signal elementary stream is input to an audio decoder 264 and the copy protection status determination circuit 270.

The copy protection status determination circuit 270 extracts the watermark (W), the ticket (T"), and the time reference signal (TD) from the video signal elementary stream and/or the audio signal elementary stream to determine the copy protection status of the video and/or audio signals. The copy protection status determination circuit 270 first compares the time reference signal (TD) to a real. time clock reference signal derived from a clock 272 located at the sink device 240. In accordance with the present invention, the clock 272 and the clocks 216, 234 are synchronized (e.g., maintain real time). Synchronization may be maintained by each receiving a broadcast time reference signal, or any other synchronization method that is known in the art. Preferably, the clocks 272, 216, and 234 are synchronized in a secure manner that is not generally accessible to a user (e.g., a user may not reset the clocks).

In the event that the time reference signal (TD) is not within an acceptable window of time, the video decoder 262 and the audio decoder 264 do not receive enabling signals 274, 273 respectively, from the copy protection status determination circuit 270. An acceptable window of time may be, for instance, +/−20 minutes of the real time clock reference signal. Therefore, the elementary streams received from the transport stream demultiplexer 266 are not decoded. In the event that the time reference signal (TD) is within the acceptable window, then the ticket is compared to the watermark to determine the copy protection status of the video and/or audio signals. Specifically, the ticket T" is combined with the time reference signal (TD), and hashed once to produce a result (T'''). The result (T''') is combined with the time reference signal (TD) and hashed again to produce a second result (T''''). The second result (T'''') is then compared to the watermark:

$$H(H(T''.TD).TD)=? W. \tag{7}$$

In the event that the second result (T'''') does not equal the watermark, then the video decoder 262 and the audio decoder 264 do not receive enabling signals 274, 273, respectively, from the copy protection status determination circuit 270. Therefore, the elementary streams received from the transport stream demultiplexer 266 are discarded and are not decoded.

However, if the second result (T'''') does equal the watermark, then the video decoder 262 and audio decoder 264 receive enabling signals 274,273, respectively, from the copy protection status determination circuit 270. In response to the received enabling signals 274,273, the elementary streams received from the transport stream demultiplexer 266 are decoded by the video decoder 262 and audio decoder 264, respectively, and decompressed video and audio signals are, respectively, output therefrom.

In an alternate embodiment, one or the other of the enabling signals 274, 273 may not be transmitted. In these embodiments, the result may be that only the encoder that receives the enabling signal is enabled. In this way, a different copy protection status may be designated and enforced for different portions of the content. For instance, a party may have paid to receive audio content (e.g., an announcers description of a sporting event) but may not have paid to also receive the video content (e.g., the video broadcast of the sporting event).

Illustratively, the decompressed video signal and the decompressed audio signal may be combined by a combiner circuit 269 to produce an NTSC, PAL, HDTV, etc. composite video signal. Alternatively the video signal may be output in SVHS, RGB, YUV, etc. form. In any event, the output video signal is presented, i.e., displayed on a display monitor 265 (e.g., television set, computer monitor, etc. having a cathode ray tube (CRT), a liquid crystal display (LCD), etc.).

Figure 4:
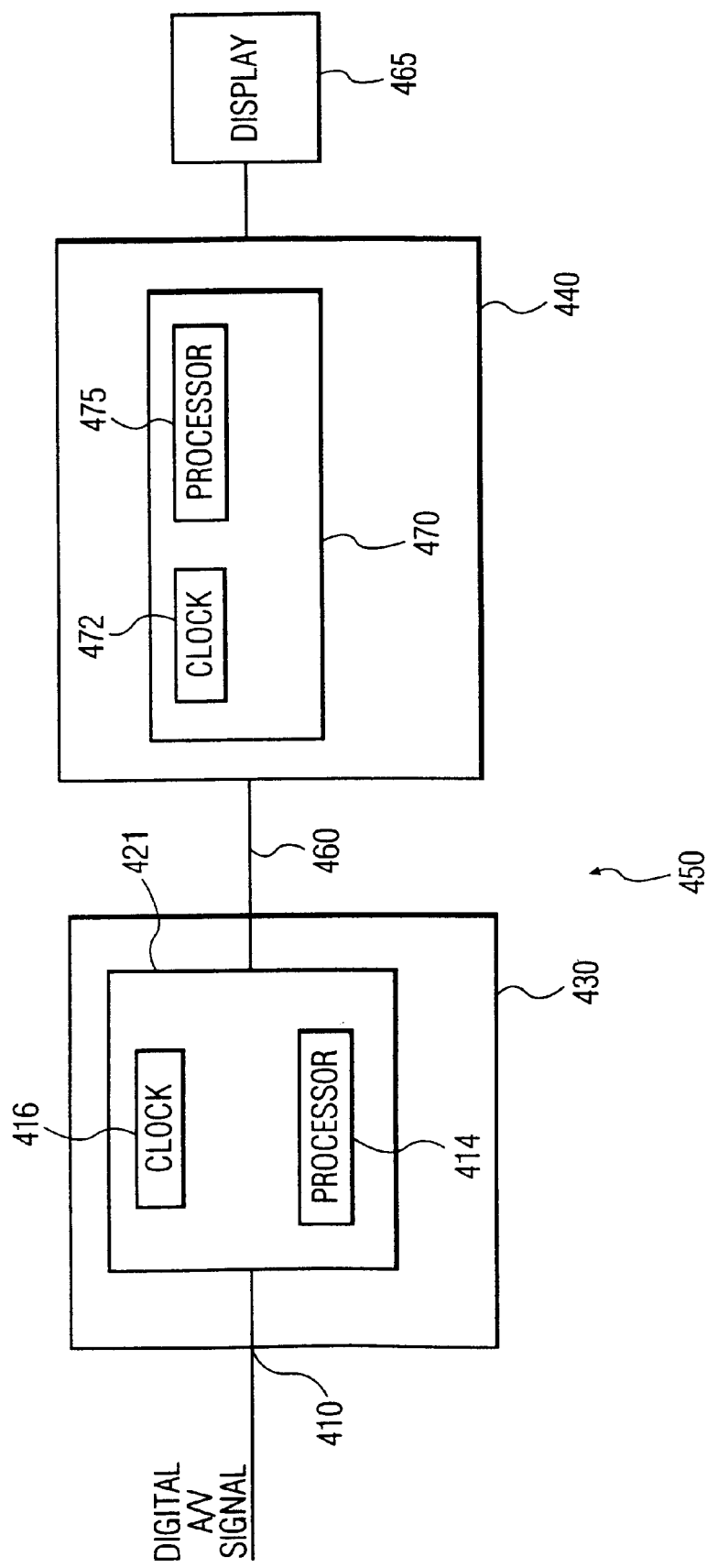
FIG. 4 shows an illustrative communication network in accordance with an embodiment of the present invention wherein a source device provides digital content to a sink.

FIG. 4 depicts an illustrative communication network 450 in accordance with an embodiment of the present invention wherein a source device 430 provides content to a sink device 440 in the form of a digital data stream. The embodiment shown in FIG. 4 operates similar to the embodiment shown in FIG. 3. For the sake of brevity, only selected portions of the operation of the embodiment shown in FIG. 4 will be described in detail below.

The digital data stream contains digital content, which is combined together with a ticket, a watermark, and a time reference (TD) by a copy protection authorization circuit 421. The source device 430 may be a Digital Video Disc (DVD) player, a Digital Video Cassette Recorder (DVCR), or any other source of digital content that is known in the art. In addition, the source device 430 may receive digital content (e.g., a digital A/V signal) in a secure way through input 410 from a content service provider as shown.

In a case wherein the Source device 430 reads digital content directly from a physical medium, such as a DVD, the physical medium will contain a physical mark (P), as discussed above, that is embedded into the physical medium. In this way, the physical mark (P) may not be removed from the physical medium without largely destroying the physical medium itself. In a case wherein the digital content is provided to the source device 430 through the input 410, the digital content will contain physical mark (P) data. Preferably, the physical mark (P) data is embedded into the digital content in such a way that an attempt to separate the physical mark (P) data and the digital content would result in largely degrading the digital content.

The source device 430 contains the copy protection authorization circuit 421 that sets the copy protection status of the digital content. The copy protection authorization circuit 421 contains a processor 414 and a clock 416. The processor 414 utilizes the physical mark (P) data and a time reference signal (TD), received from the clock 416, to create a ticket and a watermark. The time reference signal (TD) is a representation, such as a digital representation, of the time and date when creation of the ticket and watermark is commenced as discussed above.

It should be noted that the processor 414 may be a microprocessor or simply a fixed or reconfigurable hardware device that performs mathematical operations, such as a hashing function, a concatenation function, etc. In a preferred embodiment, the ticket and watermark are produced utilizing the physical mark (P) data and the time reference signal (TD) as discussed above. However, it should be noted that other mathematical combinations of the physical mark (P) data and the time reference signal (TD) may be utilized for producing the ticket and the watermark including additional hashing and/or concatenation operations. However, at least the ticket should be produced through the combination of the physical mark (P) data and the time reference signal (TD). Additionally, the watermark should be produced by at least performing a single one-way operation on the ticket. The ticket is utilized to indicate the copy protection status of the digital content (e.g., a copy protection status of copy-never).

The watermark is embedded into the digital content in such a way that the watermark can not be removed from the digital content without largely degrading the digital content. The digital content, with the watermark embedded therein, is then transmitted along with the ticket and the time reference signal (TD) via the transmission channel 460 to the sink device 440. The transmission channel 460 may be an IEEE 1394 firewire Bus, a telephone network, a cable television network, a computer data network, a terrestrial broadcast system, a direct broadcast satellite network, etc., or some combination thereof.

The sink device 440 contains a copy protection status determination circuit 470 that receives the signal from the transmission channel 460 and extracts the watermark (W), the ticket, and the time reference signal (TD). The copy protection status determination circuit 470 operates in a similar way to the copy protection determination circuit 270 shown in FIG. 3. First the time reference signal (TD) is compared to a real time clock reference signal derived from a clock 472 located at the sink device 440 to determine if the time reference signal (TD) is within an acceptable window of the real time clock reference signal. In the event that the time reference signal (TD) is within the acceptable window, then the ticket is processed by a processor 475 and compared to the watermark to determine the copy protection status of the digital content. The processor 475 may be a microprocessor or simply a fixed or reconfigurable hardware device that may perform mathematical operations, such as a hashing function, a concatenation function, etc.

When an operation being selected at the sink device 440 does not violate the determined copy protection status of the digital content, the operation is enabled to proceed. When an operation being selected at the sink device 440 does violate the determined copy protection status of the digital content, the operation is not enabled to proceed. For instance, if the copy protection status of the digital content is determined to be copy-never and yet the selected operation is record, the sink device will not be enabled to record the digital content.

Similar as discussed above, when the time reference signal is not within an acceptable window of the real time clock reference signal, the watermark is not present, the ticket does not properly compare to the watermark, or some other portion of the copy protection determination process fails, the digital content is discarded. In addition, when the copy protection determination process fails, no operation regarding the digital content is enabled at the sink device.

Finally, the above-discussion is intended to be merely illustrative of the invention. Numerous alternative embodiments may be devised by those having ordinary skill in the art without departing from the spirit and scope of the following claims.

The claimed invention is:

1. A method of protecting content transmitted as a stream of data, the method comprising the steps:

determining time data utilizing a first clock reference;

calculating a watermark utilizing seed data and said time data;

calculating a ticket utilizing said seed data and said time data, said watermark and ticket together indicating a copy protection status of the content;

transmitting said stream of data, said watermark, said ticket, and said time data to a receiving device;

comparing said time data to a time window determined by a second clock reference at said receiving device; and comparing, at said receiving device, said ticket and said watermark utilizing said time data to determine the copy protection status of the content if said time data is contained within said time window.

2. The method of protecting content as claimed in claim 1, wherein said step of calculating said watermark comprises the steps:

combining said seed data and said time data; and computing at least one, one-way function on said combined seed and time data.

3. The method of protecting content as claimed in claim 1, wherein said step of calculating said ticket comprises the steps:

combining said seed data and said time data; and computing at least one, one-way function on said combined seed and time data.

4. The method of protecting content as claimed in claim 1, wherein said step of comparing said ticket and said watermark comprises the steps:

combining said ticket and said time data;

computing at least one, one-way function on said combined ticket and time data to produce a result; and comparing said result to said watermark.

5. The method of protecting content as claimed in claim 2, further comprising the step of selecting said one-way function to be a hashing function.

6. A copy protection system for protecting content wherein a ticket and a watermark indicates a copy protection status of the content, the system comprising:

a source device for producing said ticket and said watermark using a first time reference and a one-way function, and for providing a data stream containing said content, said ticket, said watermark, and said first time reference; and a receiver device for receiving said. data stream, wherein if said first time reference is contained within a time window determined by a second time reference, said receiver further compares said ticket to said watermark using said first time reference and said one-way function, and produces a signal indicating the copy protection status of the content.

7. The copy protection system as claimed in claim 6, wherein said source device further produces said ticket and watermark using seed data.

8. The copy protection system as claimed in claim 6, wherein said one-way function is a hashing function.

9. A source device for protecting content wherein a ticket and a watermark indicate a copy protection status of the content, said source device comprising:
   a time reference device for producing a time reference signal; and
   a processor for receiving said time reference signal, for producing said ticket and said watermark using said time reference signal and a one-way function, and for providing digital data containing said content, said ticket, said watermark, and said time reference signal.

10. The source device for protecting content as claimed in claim 9, wherein said processor further produces said ticket and said watermark using seed data.

11. The source device for protecting content as claimed in claim 9, wherein said one-way function is a hashing function.

12. A receiver device for receiving digital data containing content, a ticket, a watermark, and a first time reference, wherein said ticket and said watermark together indicate a copy protection status of the content, said receiver comprising:
   a time reference device for producing a second time reference signal; and
   a processor, wherein if said first time reference is contained within a time window determined by said second time reference signal, said processor receives said digital data, combines said ticket with said first time reference to produce a first result, performs a one-way function on said first result to produce a second result, and compares said second result to said watermark to determine said copy protection status of said content.

13. The receiver device as claimed in claim 12, wherein said one-way function is a hashing function.

14. A copy protection system for protecting content wherein a ticket and a watermark indicates a copy protection status of the content, wherein the copy protection system comprises:
   a source device comprising:
   means for producing said ticket and said watermark using a first time reference and a one-way function;
   means for combining said content, said ticket, said watermark, and said first time reference into a data stream; and
   means for outputting said data stream, and wherein the copy protection system further comprises:
      a receiver device for receiving said data stream, said receiver device comprising:
      means for receiving said data stream;
      means for producing a second time reference and for generating a time window;
      means for determining if said first time reference is contained within said time window; and
      means for comparing said ticket to said watermark using said first time reference and said one-way function, and for producing a signal indicating the copy protection status of the content, if said determining means determines that said first time reference is contained within said time window.

* * * * *